United States Patent
Katano

(10) Patent No.: US 8,546,035 B2
(45) Date of Patent: Oct. 1, 2013

(54) FUEL CELL SYSTEM

(75) Inventor: Koji Katano, Toyoto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 249 days.

(21) Appl. No.: 12/994,892

(22) PCT Filed: Jun. 8, 2009

(86) PCT No.: PCT/JP2009/060420
§ 371 (c)(1),
(2), (4) Date: Nov. 29, 2010

(87) PCT Pub. No.: WO2009/151017
PCT Pub. Date: Dec. 17, 2009

(65) Prior Publication Data
US 2011/0076584 A1    Mar. 31, 2011

(30) Foreign Application Priority Data

Jun. 10, 2008  (JP) ................................. 2008-151736

(51) Int. Cl.
*H01M 8/04* (2006.01)
(52) U.S. Cl.
USPC ........... 429/444; 429/400; 429/428; 429/443; 180/65.1; 180/65.31
(58) Field of Classification Search
USPC ............................ 429/26, 430, 444, 513, 492
See application file for complete search history.

(56) References Cited

U.S. PATENT DOCUMENTS

| | | | |
|---|---|---|---|
| 4,685,287 A * | 8/1987 | Takuma | 60/785 |
| 6,488,345 B1 * | 12/2002 | Woody et al. | 303/152 |
| 6,924,050 B2 * | 8/2005 | Lahiff | 429/430 |
| 7,848,867 B2 * | 12/2010 | Ueno | 701/70 |
| 8,053,123 B2 * | 11/2011 | Imamura | 429/430 |
| 2007/0026281 A1 * | 2/2007 | Ueda et al. | 429/26 |

FOREIGN PATENT DOCUMENTS

| | | |
|---|---|---|
| DE | 11 2008 000 096 T5 | 11/2009 |
| DE | 11 2008 000 628 T5 | 12/2009 |
| JP | 05-111299 A | 4/1993 |

(Continued)

OTHER PUBLICATIONS

Machine Translation of Aramaki (JP2006-6088, Published Jan. 5, 2006).*

(Continued)

*Primary Examiner* — Basia Ridley
*Assistant Examiner* — Caitlin Wilmot
(74) *Attorney, Agent, or Firm* — Kenyon & Kenyon LLP

(57) ABSTRACT

Provided is a fuel cell system capable of ensuring responsiveness during acceleration even when a motor with a smaller torque as compared to the related art is used. A control apparatus reduces the revolution speeds of motors of an air compressor, a circulation pump and a cooling pump by a coasting operation, without performing a regenerative control, when a load required from a fuel cell (electrical power required by various motors and auxiliary apparatuses) is being reduced and a travel speed is equal to or higher than a set speed. With such a configuration, even when a driver later reaccelerates a vehicle by, for example, pressing down an accelerator, required acceleration force is smaller as compared to the related art, and thus a motor with a small torque can be employed.

7 Claims, 6 Drawing Sheets

(56) References Cited

FOREIGN PATENT DOCUMENTS

| | | |
|---|---|---|
| JP | 2004-362851 A | 12/2004 |
| JP | 2006-6088 A | 1/2006 |
| JP | 2006-134806 A | 5/2006 |
| JP | 2007-12533 A | 1/2007 |
| JP | 2007-123029 A | 5/2007 |
| JP | 2007-250272 A | 9/2007 |
| WO | WO2008-142973 | * 11/2008 |

OTHER PUBLICATIONS

Machine Translation of Horai (JP2007-123029, Published May 17, 2007).*

* cited by examiner

FUEL CELL SYSTEM

This is a 371 national phase application of PCT/JP2009/060420 filed 08 Jun. 2009, which claims priority to Japanese Patent Application No. 2008-151736 filed 10 Jun. 2008, the contents of which are incorporated herein by reference.

FIELD OF THE INVENTION

The present invention relates to a fuel cell system.

BACKGROUND OF THE INVENTION

In this day and age when there is concern regarding the dependence on oil by a future motorized society, people are expecting that automobiles equipped with a hybrid fuel cell system will become popular. The hybrid fuel cell system includes a fuel cell and a battery (secondary cell) as power sources. The fuel cell and the battery are connected in parallel with respect to a load, and high-voltage converters for converting voltages are arranged between the fuel cell and the load and between the battery and the load, respectively.

A load applied on a hybrid fuel cell system installed in vehicles such as automobiles greatly varies as compared to a load applied on a stationary hybrid fuel cell system which is installed in buildings.

Thus, the revolution speed of each pump which supplies reactant gases (an oxidant gas and a fuel gas) to a fuel cell greatly varies in response to the variation of load. For example, when a driver suddenly stops pressing down an accelerator (see al in FIG. 3), the load is greatly reduced. The revolution speed of each pump needs to be reduced in accordance with the reduction of the load. In the related art, as disclosed in patent document 1, the revolution speed of each pump has been reduced in response to the reduction of the load by a regenerative control for each pump (i.e., by operating a motor of each pump as an electric generator, converting a mechanical energy to an electric energy, and returning the electric energy to a power source, etc.) (see α2 in FIG. 3).

RELATED ART REFERENCE

Patent Document
Patent Document 1: Japanese laid-open patent publication No. 5-111299

SUMMARY OF THE INVENTION

Problem to be Solved by the Invention

When the regenerative control for each pump is performed in response to the reduction of the load, the revolution speed of a motor will be greatly reduced. In this state, a reacceleration command (e.g., a sudden acceleration command) is sometimes issued with the revolution speed of the motor being very low (e.g. a situation where a driver presses down an accelerator when a vehicle enters from a flat road to an upslope).

In the related art, a high torque motor which can exhibit a high torque performance has been used as a motor for driving each pump in order to respond to such a reacceleration command (i.e., in order to ensure responsiveness during acceleration). However, the use of such motors has caused the cost and size of apparatuses to increase.

The present invention has been made in light of the circumstances above, and an object of the present invention is to provide a fuel cell system capable of ensuring responsiveness during acceleration even if a motor with a lower torque as compared to the motors of the related art is used.

Means for Solving the Problem

In order to achieve the object above, provided according to the present invention is a fuel cell system, for a mobile body, which includes: a fuel cell; and a motor whose revolution speed varies in accordance with a load required from the fuel cell and which can be controlled by a regenerative control, the fuel cell system comprising: a judgment unit which judges whether or not both conditions in which: a fuel cell load is being reduced; and a travel speed is equal to or higher than a set speed, are satisfied; and a revolution speed control unit which avoids the regenerative control of the motor and reduces the revolution speed of the motor by a coasting operation when the judgment unit obtains a positive judgment result.

With such a configuration, when the load required from the fuel cell (electrical power required by various motors and auxiliary apparatuses) is being reduced and the travel speed is equal to or higher than the set speed, the revolution speed of the motor is reduced by the coasting operation, without performing the regenerative control. Accordingly, even when a driver later reaccelerates a vehicle by, for example, pressing down an accelerator (see β2 in FIG. 3), the required acceleration force is smaller as compared to the related art and thus a motor with a small torque (i.e., a small motor) can be employed, thereby decreasing the cost and size of the apparatus as compared to the related art. In other words, when the revolution speed of the motor is reduced by the coasting operation, the reduction in the revolution speed can be reduced as compared to the case where the revolution speed of the motor is reduced by a regenerative operation. Accordingly, a smaller motor as compared to the related art can be employed.

In the above configuration, it is preferable that the judgment unit judges whether or not both conditions in which: the mobile body is being decelerated; and a travel speed is equal to or higher than a set speed, are satisfied. Also, it is preferable that: the motor is a motor which drives a pump for supplying a reactant gas to the fuel cell; and the set speed is a speed which is set in consideration of: an external noise level which is generated when the mobile body travels at the set speed; and an internal noise level which is generated when the motor is rotated by the coasting operation.

In the above configuration, it is preferable that: the motor is a motor which drives a circulation pump for returning at least a part of a fuel-off gas discharged from the fuel cell to a supply path for a fuel gas; and the fuel cell system further comprises: a first detection unit which detects whether or not the revolution speed of the motor falls below a lower limit threshold value due to the reduction of the revolution speed of the motor by the coasting operation; and a regulating unit which increases a concentration of hydrogen gas contained in the fuel gas to be supplied to the fuel cell when the revolution speed of the motor falls below the lower limit value.

In the above configuration, it is preferable that: a purge path branches from the circulation path; and the regulating unit increases the concentration of the hydrogen gas contained in the fuel gas to be supplied to the fuel cell by regulating an amount of the fuel-off gas to be exhausted outside using a purge valve provided in the purge path.

In the above configuration, it is preferable that: the motor is a motor which drives a compressor for supplying oxidant gas to the fuel cell; and the fuel cell system further comprises: a second detection unit which detects whether or not the revolution speed of the motor falls below a lower limit threshold value due to the reduction of the revolution speed of the motor by the coasting operation; and a scavenging processing unit which performs, using an oxidant gas to be supplied to the fuel cell, scavenging for a supply path for the oxidant gas when the revolution speed of the motor falls below the lower limit value.

Also, it is preferable that a bypass path is connected between the supply path for the oxidant gas and a discharge path for the oxidant gas, the bypass path guiding at least a part of unreacted oxidant gas to the outside; the bypass path is provided with a bypass valve which regulates an amount of the unreacted gas to be exhausted outside; and the fuel cell system further comprises a bypass valve regulating unit which regulates, when the scavenging processing unit performs the scavenging for the supply path, an amount of oxidant gas to be supplied to the fuel cell using the bypass valve.

As described above, the present invention can ensure responsiveness during acceleration without using a high torque motor.

BEST MODE FOR CARRYING OUT THE INVENTION

A preferred embodiment of the present invention will be described below with reference to the attached drawings. First, the outline of a fuel cell system in the present invention will be described.

A. Embodiment

Figure 1:
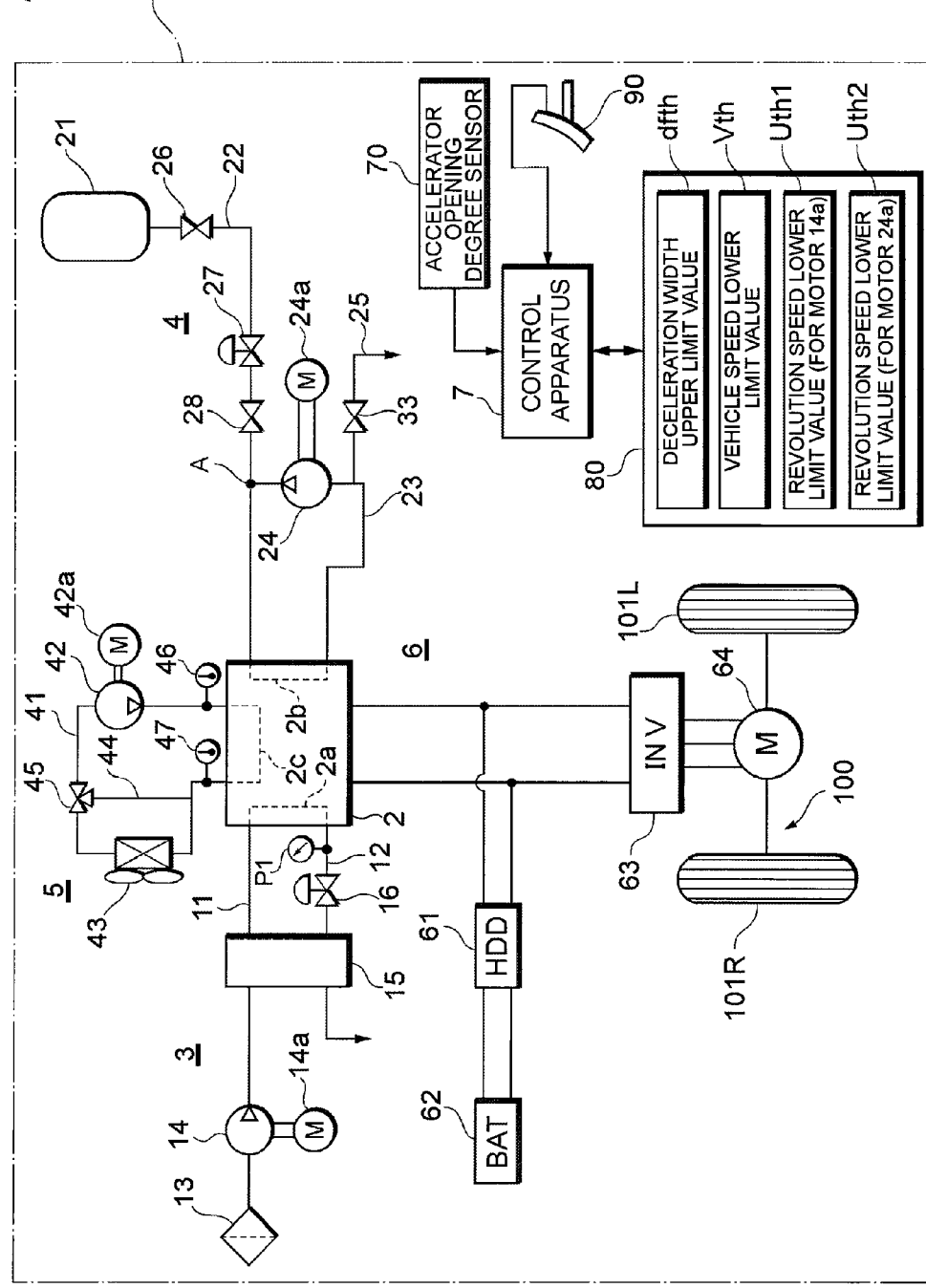
FIG. 1 is a configuration diagram showing a fuel cell system according to an embodiment of the present invention.

FIG. 1 is a configuration diagram showing a fuel cell system 1 according to a first embodiment.

The fuel cell system 1 according to the present embodiment has a feature in the point that, regarding pumps for supplying reactant gasses to a fuel cell, when a load required from the fuel cell (electrical power required by various motors and auxiliary apparatuses) is being reduced and a travel speed is equal to or higher than a set speed, the revolution speeds of the motors which drive the pumps are reduced by a coasting operation (an operation in the state where the supply of electrical power to the motors is stopped), without performing a regenerative control. The state of "when a load required from the fuel cell is being reduced" includes, in addition to a state where a vehicle is being decelerated, a state where the vehicle is accelerated due to a downslope, etc. In short, the state of "when a load required from the fuel cell is being reduced" is a concept which is not limited to the state where the vehicle is being decelerated but also encompasses the state where the vehicle is accelerated.

Note that, although, in the following description, the present embodiment assumes a fuel cell system installed in a fuel cell hybrid vehicle (FCHV), the fuel cell system may also be applied to vehicles 100 such as electric vehicles and hybrid vehicles, as well as various mobile objects (e.g., ships, airplanes and robots) other than the vehicles 100.

The fuel cell system 1 includes: a fuel cell 2; an oxidant gas pipe system 3 which supplies the air serving as an oxidant gas to the fuel cell 2; a fuel gas pipe system 4 which supplies a hydrogen gas serving as a fuel gas to the fuel cell 2; a coolant pipe system 5 which supplies coolant to the fuel cell 2; a power system 6 which allows charge and discharge of electrical power for the system 1; and a control apparatus 7 which centrally controls the operation of the system 1. The oxidant gas and the fuel gas will be referred to as the "reactant gases" when appropriate.

The fuel cell 2 is, for example, a solid polymer electrolyte type which has a stack structure with a lot of unit cells stacked therein. Each unit cell has an air electrode (cathode) on one surface of an electrolyte constituted from an ion-exchange membrane and a fuel electrode (anode) on the other surface of the electrolyte, and the unit cell further has a pair of separators arranged so as to sandwich the air electrode and the fuel electrode therebetween. The oxidant gas is supplied to an oxidant gas flow path $2a$ of one separator, while the fuel gas is supplied to a fuel gas flow path $2b$ of the other separator. The fuel cell 2 generates electrical power through an electrochemical reaction between the supplied fuel gas and oxidant gas. The electrochemical reaction in the fuel cell 2 is an exothermic reaction, and the temperature of the solid polymer electrolyte type fuel cell 2 becomes about 60 to 80°C.

The oxidant gas pipe system 3 includes: a supply path 11 in which the oxidant gas to be supplied to the fuel cell 2 flows; and a discharge path 12 in which an oxidant-off gas discharged from the fuel cell 2 flows. The supply path 11 communicates with the discharge path 12 via the oxidant gas flow path $2a$. The oxidant-off gas contains moisture produced in a cell reaction in the fuel cell 2 and is thus in a highly humid condition.

The supply path 11 is provided with: a compressor 14 which introduces the external air via an air cleaner 13; and a humidifier 15 which humidifies the oxidant gas compressed and sent to the fuel cell 2 by the compressor 14.

The oxidant-off gas contains moisture produced in a cell reaction in the fuel cell 2 and is thus in a highly humid condition. The amount of oxidant gas to be supplied to the air electrode side of the fuel cell 2 is regulated by controlling the revolution speed, etc. of a motor $14a$ which drives the compressor 14. The backpressure of the air electrode side of the fuel cell 2 is regulated by a backpressure regulating valve 16 which is arranged in the discharge path 12 at a position near an outlet of the cathode. Provided in the vicinity of the backpressure regulating valve 16 is a pressure sensor P1 which detects the pressure inside the discharge path 12. After passing through the backpressure regulating valve 16 and the humidifier 15, the oxidant-off gas is finally exhausted to the atmosphere outside the system as an exhaust gas.

The backpressure of the air electrode side of the fuel cell 2 is regulated by the backpressure regulating valve 16 which is arranged in the discharge path 12 at a position near an outlet of the cathode. Provided in the vicinity of the backpressure regulating valve 16 is a pressure sensor P1 which detects the pressure inside the discharge path 12. After passing through the backpressure regulating valve 16 and the humidifier 15, the oxidant-off gas is finally exhausted to the atmosphere outside the system as an exhaust gas.

The fuel gas pipe system 4 includes: a hydrogen supply source 21; a supply path 22 in which the hydrogen gas to be supplied from the hydrogen supply source 21 to the fuel cell 2 flows; a circulation path 23 for returning a hydrogen-off gas (fuel-off gas) discharged from the fuel cell 2 to a point of merge A on the supply path 22; a circulation pump 24 which pumps the hydrogen-off gas inside the circulation path 23 to the supply path 22; and a purge path 25 which branches from the circulation path 23. The amount of hydrogen-off gas to be returned to the supply path 22 is regulated by controlling the revolution speed of the motor 24$a$ which drives the circulation pump 24. The hydrogen gas which flows, as a result of opening a check valve 26, into the supply path 22 from the hydrogen supply source 21 is supplied to the fuel cell 2 after passing through a pressure regulating valve 27, other pressure-reducing valves and a cutoff valve 28. The purge path 25 is provided with a purge valve 33 for discharging the hydrogen-off gas to a hydrogen diluter (not shown).

The coolant pipe system 5 includes: a coolant flow path 41 which communicates with a cooling flow path 2$c$ in the fuel cell 2; a cooling pump 42 provided in the coolant flow path 41; a radiator 43 which cools coolant discharged from the fuel cell 2; a bypass flow path 44 which bypasses the radiator 43; and a switch valve 45 which sets the distribution of cooling water to the radiator 43 and the bypass flow path 44. The coolant flow path 41 includes: a temperature sensor 46 provided in the vicinity of a coolant inlet of the fuel cell 2; and a temperature sensor 47 provided in the vicinity of a coolant outlet of the fuel cell 2. A coolant temperature which is detected by the temperature sensor 47 reflects the internal temperature of the fuel cell 2 (hereinafter referred to as the "temperature of the fuel cell 2"). Note that the temperature sensor 47 may be configured to detect the temperature of components around the fuel cell instead of (or in addition to) the coolant temperature. The amount of coolant flowing in the coolant flow path 41 is regulated by controlling the revolution speed of a motor 42$a$.

The power system 6 includes a high-voltage DC/DC converter 61, a battery 62, a traction inverter 63, a traction motor 64, and auxiliary inverters (not shown) connected to the respective motors. The high-voltage DC/DC converter 61 is a direct-current voltage converter, which has: a function of regulating a direct-current voltage input from the battery 62 and outputting the regulated voltage to the traction inverter 63; and a function of regulating a direct-current voltage input from the fuel cell 2 or the traction motor 64 and outputting the regulated voltage to the battery 62. Due to these functions of the high-voltage DC/DC converter 61, the battery 62 can be charged and discharged. Also, the high-voltage DC/DC converter 61 controls an output voltage of the fuel cell 2.

The traction inverter 63 converts a direct current to a three-phase alternating current, and supplies the three-phase alternating current to the traction motor 64. The traction motor 64 is, for example, a three-phase alternating current motor. The traction motor 64 serves as a main power source for, for example, a vehicle 100 equipped with the fuel cell system 1, and the traction motor 64 is coupled to wheels 101L and 101R of the vehicle 100.

The drives of the compressor 14, the circulation pump 24 and the cooling pump 42 are respectively controlled by the corresponding motors 14$a$, 24$a$ and 42$a$. The motors 14$a$ and 24$a$ provided in the compressor 14 and the circulation pump 24 realize a function of reducing the revolution speed of these motors by a coasting operation when the vehicle is being decelerated and the vehicle speed is equal to or higher than a predetermined speed (hereinafter referred to as the "revolution speed reduction function by a coasting operation") (described later in more detail), in addition to a function similar to the regenerative control function in the related art, i.e., the function of operating the motors of the pumps as electric generators, converting a mechanical energy to an electric energy and returning the electric energy to a power source, etc. The drive of each motor is controlled by the control apparatus 7.

The control apparatus 7 is configured as a microcomputer which has a CPU, a ROM and a RAM inside. The CPU executes a desired computation in accordance with a control program, and performs various types of processing and controls, such as the control of a normal operation. The ROM stores the control program or control data processed by the CPU. The RAM is used as various work areas mainly for processing control.

Detected signals from various types of sensors such as the pressure sensor P1, the temperature sensors 46 and 47 and an accelerator opening degree sensor 70 which detects the opening degree of the accelerator in the vehicle 100 are input to the control apparatus 7, and the control apparatus 7 outputs control signals to respective components (such as the compressor 14 and the backpressure regulating valve 16).

The control apparatus 7 controls the revolution speeds of the motor 14 which drives the air compressor 14 and the motor 24$a$ which drives the circulation pump 24 based on a vehicle speed V detected by the accelerator opening degree sensor 70, etc. and an operation command from a brake pedal. Note that the motors 14$a$ and 24$a$ will be hereinafter collectively referred to as the "reactant gas supply control motors," for convenience of explanation.

Figure 2:
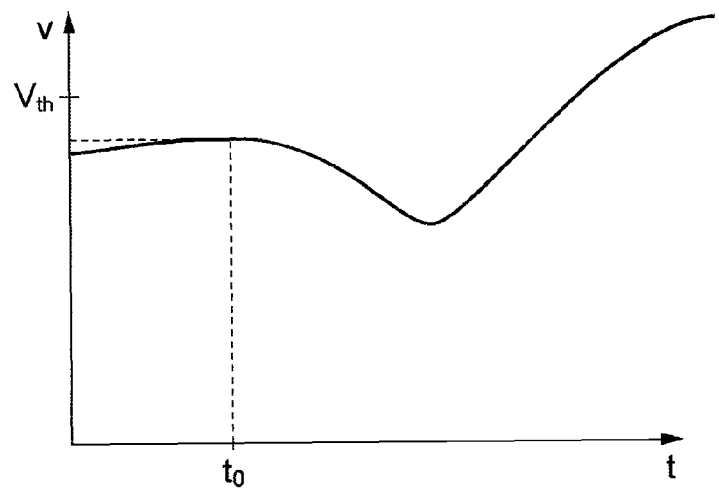
FIG. 2 is a diagram showing an example of variation in the vehicle speed of a vehicle according to the above embodiment.
Figure 3:
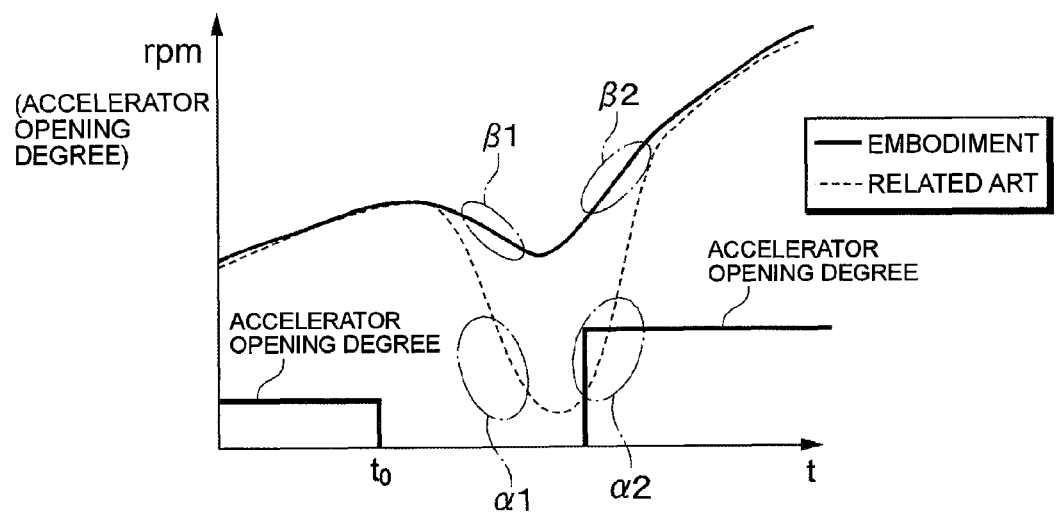
FIG. 3 is a diagram showing an example of the relationship between the revolution speeds of motors and the opening degree of an accelerator when the vehicle speed varies according to the above embodiment.

FIG. 2 is a diagram showing an example of variation in vehicle speed of the vehicle, and FIG. 3 is a diagram showing an example of the relationship between the revolution speeds of the reactant gas supply control motors and the opening degree of the accelerator when the vehicle speed varies as shown in FIG. 2. Note that, in FIG. 3, the dashed line shows variation in the revolution speeds of the reactant gas supply control motors in the related art, while the solid line shows variation in the revolution speed of the reactant gas supply control motors in the present embodiment.

As shown in FIGS. 2 and 3, when a driver stops pressing down the accelerator (see time t0), the vehicles starts to decelerate. At this time, the control apparatus 7 obtains a deceleration width df per unit time, while obtaining the vehicle speed V of the vehicle, based on a detection signal from the accelerator opening degree sensor 70, etc. The control apparatus (judgment unit) 7 judges whether or not the obtained deceleration width df exceeds a deceleration width upper limit value dfth stored in the memory 80, and also judges whether or not the vehicle speed V of the vehicle is above a vehicle speed lower limit value Vth stored in the memory 80 (see inequalities (1) and (2) below). Note that FIG. 2 assumes the situation where inequalities (1) and (2) below are satisfied (the situation where the judgment results are positive).

$$df > dfth \qquad (1)$$

$$V > Vth \qquad (2)$$

The deceleration width upper limit value dfth and the vehicle speed lower limit value Vth stored in the memory 80 may be arbitrarily set and changed in accordance with the design of the system, etc. However, it is desirable that the vehicle speed lower limit value (set speed) Vth is determined in consideration of external noises such as a noise from tires and a wind noise during the travel of the vehicle. Specifically, if the external noise is large, noises from the air compressor 14 and the circulation pump 24 (hereinafter referred to as the "pump noises" (internal noise)) caused by the revolutions of the reactant gas supply control motors are drowned out by the external noise, so that the driver will not have an uncomfortable feeling. Accordingly, it is desirable that the vehicle speed lower limit value Vth is set to a value which allows the pump noises to be drowned out by the external noises such as the noise from tires and the wind noise during the travel of the vehicle, even when the revolution speeds of the air compressor 14 and the circulation pump 24 are reduced only by a coasting operation (i.e., when the revolution speeds of the motors are maintained to be higher as compared to the related art; see FIG. 3). Note that the vehicle speed which allows the pump noises to be drowned out by the external noises may be obtained in advance by experiments, etc.

As described above, in the related art, the regenerative control has been performed in accordance with the deceleration of the vehicle in order to reduce the revolution speeds of the reactant gas supply control motors 14a and 24a, even when the conditions shown by inequalities (1) and (2) above are satisfied (see the dashed line in FIG. 3). On the other hand, the present embodiment realizes the revolution speed reduction function by a coasting operation shown by the solid line in FIG. 3 when the control apparatus (revolution speed control unit) 7 determines that the conditions shown by inequalities (1) and (2) above are satisfied.

Figure 4:
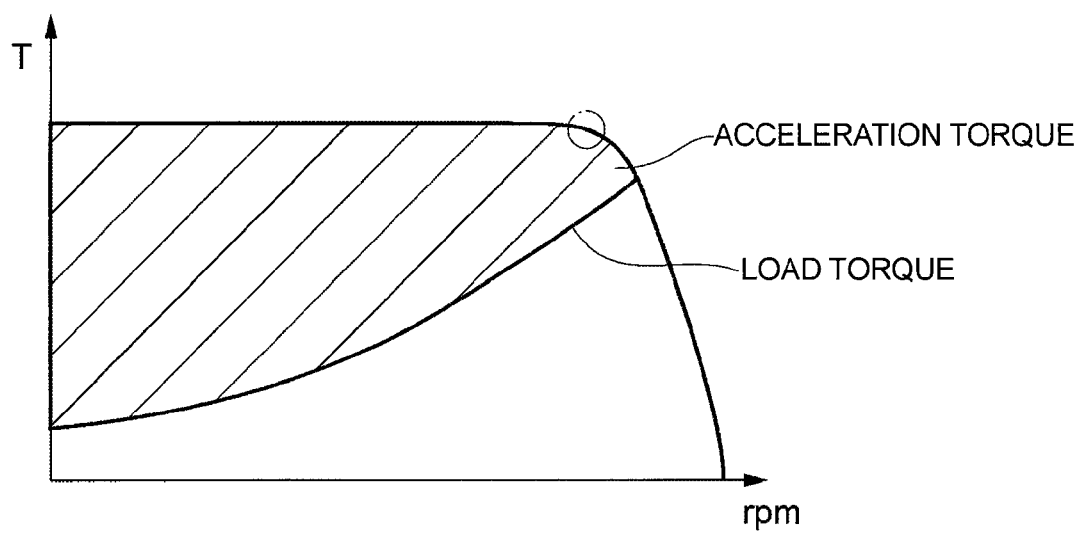
FIG. 4 is a diagram showing an example of the relationship between the revolution speeds of the motors and a load torque according to the above embodiment.

FIG. 4 is a diagram showing an example of the relationship between the revolution speeds of the reactant gas supply control motors and a load torque. As shown in FIG. 4, the higher the revolution speed of the reactant gas supply control motor becomes, the larger the load torque becomes. Specifically, in accordance with the increase of the revolution speed of the motor 24a of the circulation pump 24 for circulating the fuel gas, the flow rate of circulated fuel gas increases, and a pressure loss increases in accordance with the increase of the flow rate, which causes the load torque to increase. On the other hand, the revolution speed and the load torque of the motor 14a of the air compressor 14 for supplying the oxidant gas correspond respectively to the flow rate and the pressure of oxidant gas, and the pressure (load torque) increases in accordance with the increase of the flow rate (revolution speed).

As described above, for both the motors, the load torques increase in accordance with the increase of the revolution speeds. However, in general, a motor is designed in consideration of an acceleration torque shown by the oblique lines in FIG. 4 and a load torque shown by the solid line in FIG. 4 (see the white circle in FIG. 4), and thus, if a small acceleration torque (i.e., acceleration force) is enough, the motor can be accordingly downsized. In other words, a motor with a small torque can be employed.

In this regard, since the revolution speed of a motor is greatly reduced in accordance with the reduction of the vehicle speed in the related art as shown by α1 in FIG. 3 (regenerative control function), a motor with a large torque (i.e., a motor having a torque which is large enough to respond to sudden acceleration) needs to be employed in consideration of the situation where a driver later reaccelerates the vehicle by pressing down the accelerator (see α2 in FIG. 3). Such an aspect of the related art has caused the cost and size of the apparatus to increase.

On the other hand, in the present embodiment, when the conditions of (1) and (2) above are satisfied, the reduction in the revolution speed of the motor is minimized by a coasting operation, without performing the regenerative control, as shown by β1 in FIG. 3 (revolution speed reduction function by a coasting operation). With such a configuration, even when a driver later reaccelerates the vehicle by, for example, pressing down the accelerator (see β2 in FIG. 3), the required acceleration force is smaller as compared to the related art and thus a motor with a small torque (i.e., a small motor) can be employed, thereby decreasing the cost and size of the apparatus as compared to the related art.

Figure 5:
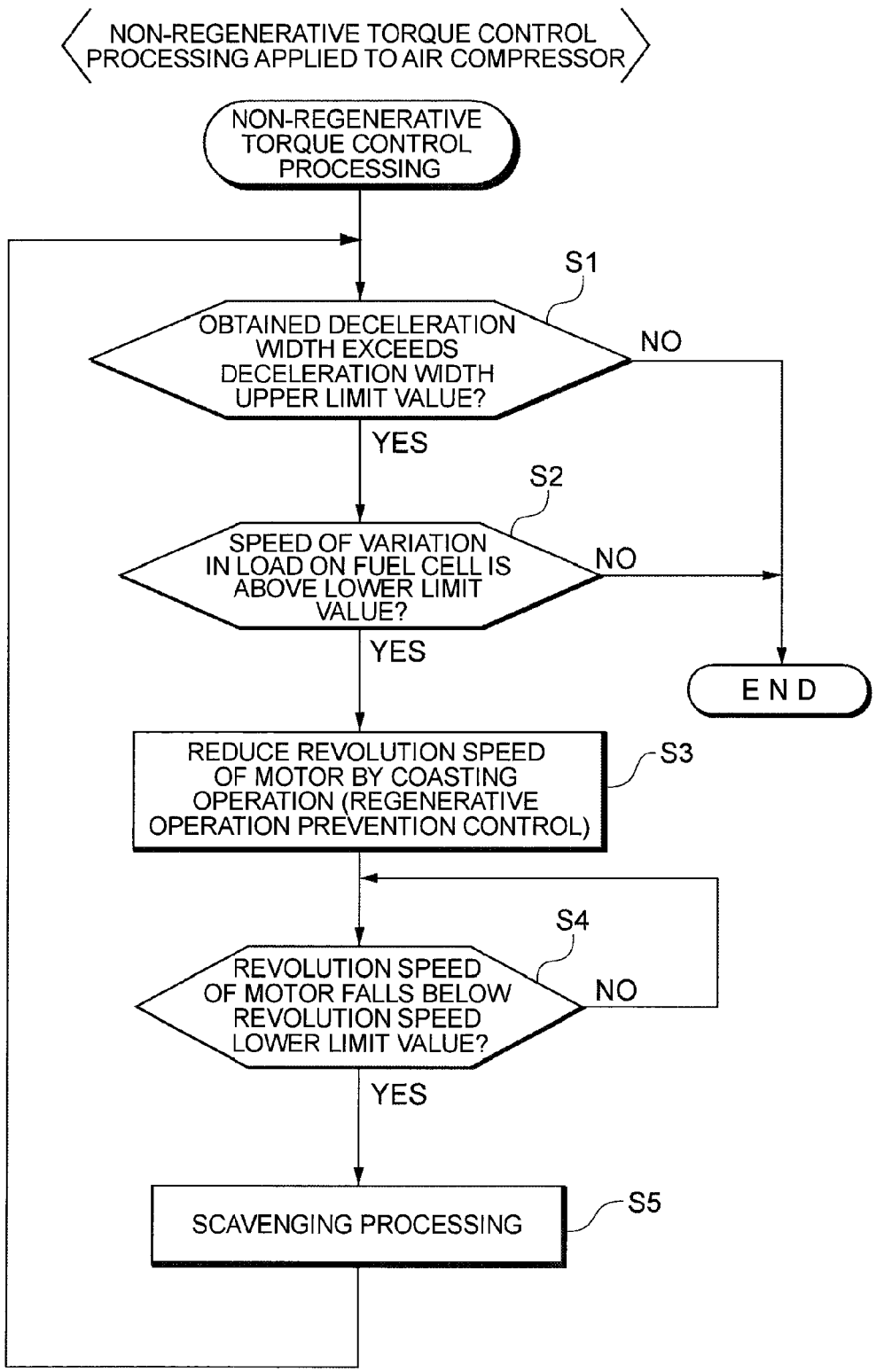
FIG. 5 is a flowchart showing non-torque control processing according to the above embodiment.
Figure 6:
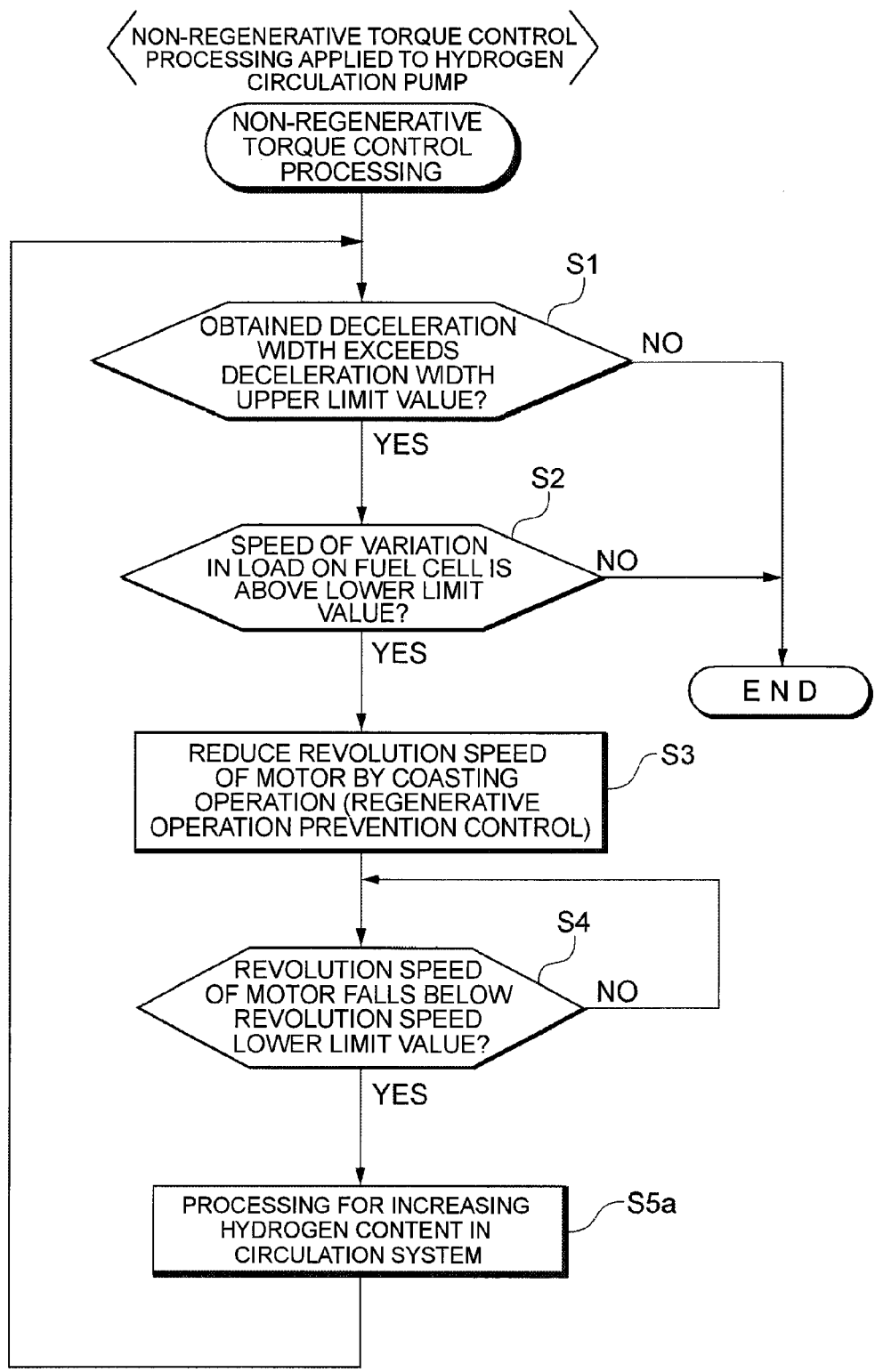
FIG. 6 is a flowchart showing the non-torque control processing according to the above embodiment.

Next, non-regenerative torque control processing, which is performed by the control apparatus 7 in order to realize the revolution speed reduction function by a coasting operation, will be described with reference to FIGS. 5 and 6. Of the reactant gas supply control motors 14a and 24a, non-regenerative torque control processing performed for controlling the motor 14a which drives the air compressor 14a is shown in FIG. 5, while non-regenerative torque control processing performed for controlling the motor 24a which drives the hydrogen circulation pump 24a is shown in FIG. 6. Note that, in the steps shown in FIGS. 5 and 6, like reference numerals refer to like steps, and a detailed description thereof will be omitted.

Non-Regenerative Torque Control Processing Applied to Air Compressor 14

The control apparatus (judgment unit) 7 obtains a deceleration width df per unit time based on detection signals from the accelerator opening degree sensor 70, etc., and judges whether or not the obtained deceleration width df exceeds the deceleration width upper limit value dfth stored in the memory 80 (step S1). When the obtained deceleration width df does not exceed the deceleration width upper limit value dfth (step S1; NO), the control apparatus (judgment unit) 7 ends the non-regenerative torque control processing. On the other hand, when the obtained deceleration width df exceeds the deceleration width upper limit value dfth (see inequality (1) above), the control apparatus (judgment unit) 7 proceeds to step S2 and judges whether or not the speed of variation in load on the fuel cell 2 is above a lower limit value. Note that the present embodiment assumes, as an example of judging whether or not the speed of variation in load on the fuel cell 2 is above the lower limit value, the configuration in which whether or not the vehicle speed V is above the vehicle speed lower limit value Vth stored in the memory 80 is judged. Detection of the "load" here may be realized by focusing on an output voltage, output current and output power of the fuel cell 2, where whether or not parameter values thereof are above the lower limit values are judged.

When determining that the speed of variation in load on the fuel cell 2 is not above the lower limit value (i.e., the obtained vehicle speed V is not above the vehicle speed lower limit value Vth), the control apparatus (revolution speed control unit) 7 ends the non-regenerative torque control processing. On the other hand, when determining that the speed of variation in load on the fuel cell 2 is above the lower limit value (i.e., the obtained vehicle speed V is above the vehicle speed lower limit value Vth) (see inequality (2) above), the control apparatus (revolution speed control unit) 7 proceeds to step S3 and reduces the revolution speed of the motor 14a of the air compressor 14 by a coasting operation, without performing the regenerative control. The control apparatus (second detection unit) 7 then judges whether or not the revolution speed of the motor 14a falls below a revolution speed lower limit value Uth1 stored in the memory 80 (step S4). When determining that the revolution speed of the motor 14a falls below the revolution speed lower limit value Uth1, the control apparatus (scavenging processing unit) 7 performs scavenging processing by supplying electrical power to the motor 14a (step S5). By performing the scavenging processing, reduction in the revolution speed of the motor 14a is suppressed, and produced water (remaining water) remaining in a cathode, etc. of the fuel cell is drained outside and the remaining water which has a detrimental effect on power generation is thus reduced, thereby providing an advantage where power generation efficiency in the fuel cell 2 during reacceleration can be increased. The control apparatus 7 then returns to step S1, repeats the above-described sequence of steps, and ends the above processing when negative judgment result "NO" is obtained in step S1 or S2.

Non-Regenerative Torque Control Processing Applied to Hydrogen Circulation Pump 24

After undergoing steps S1, S2 and S3, the control apparatus 7 reduces the revolution speed of the motor 24a of the circulation pump 24 by a coasting operation. The control apparatus (first detection unit) 7 then judges whether or not the revolution speed of the motor 24a falls below a revolution speed lower limit value Uth2 stored in the memory (step S4). When determining that the revolution speed of the motor 14a falls below the revolution speed lower limit value Uth2, the control apparatus (adjustment unit) 7 performs processing for increasing hydrogen concentration in a circulation system (specifically, purge processing or processing for increasing supply pressure) (step S5a).

For example, when the purge processing is performed, the control apparatus 7 adjusts the opening degree or ON/OFF time of the purge valve 33. By performing the purge processing, etc. as described above, the hydrogen concentration in the circulation system increases while an average molecular weight decreases, thereby reducing a pressure loss. As a result, the load torque of the motor 24a is reduced, and the reduction in the revolution speed of the motor 24a becomes slow. In addition, the increase in hydrogen concentration in the circulation system will provide an advantage where power generation efficiency of the fuel cell 2 during reacceleration increases. The control apparatus 7 then returns to step S1, repeats the above-described sequence of steps, and ends the above processing when negative judgment result "NO" is obtained in step S1 or S2.

As described above, in the present embodiment, the revolution speed of the motors are reduced by a coasting operation, without performing the regenerative control, when the vehicle is being decelerated and the vehicle speed is equal to or higher than a predetermined speed. With such a configuration, even when a driver later reaccelerates the vehicle by, for example, pressing down the accelerator (see (32 in FIG. 4), the required acceleration force is smaller as compared to the related art and thus a motor with a small torque (i.e., a small motor) can be employed, thereby decreasing the cost and size of the apparatus as compared to the related art.

Furthermore, in the situation where the present embodiment is applied to the air compressor 14, by performing the scavenging processing when the revolution speed of the motor 14a of the air compressor 14 falls below a predetermined value, it becomes possible to increase the power generation efficiency of the fuel cell 2 during the reacceleration, while suppressing the reduction in the revolution speed of the motor 14a On the other hand, in the situation where the present embodiment is applied to the hydrogen circulation pump 24, by performing the purge processing, etc. when the revolution speed of the motor 24a of the hydrogen circulation pump 24 falls below a predetermined value, it becomes possible to increase the power generation efficiency of the fuel cell 2 during the reacceleration, while suppressing reduction in the revolution speed of the motor 24a.

In addition, the above-described non-regenerative torque control processing is performed when the vehicle speed is equal to or higher than a predetermined value, more specifically, when the pump noises from the air compressor 14 and the circulation pump 24 are in a level where the pump noises are drowned out by external noises such as a noise from tires and a wind noise during the travel of the vehicle, the problem that the driver has an uncomfortable feeling can be prevented.

B. Modifications

Modification 1

Although the embodiment above has described a configuration where the present invention is applied to the motor 14a which drives the air compressor 14 and the motor 24a which drives the hydrogen circulation pump 24, the present invention may also be applied to, for example, the motor 42a which drives the cooling pump 42 as well as to motors (not shown), of other auxiliary apparatuses, whose revolution speeds are controlled in accordance with electrical power supplied from the fuel cell 40. The present invention is applicable to any rotary bodies whose revolution speeds vary in accordance with a current or a voltage supplied from the fuel cell 2.

Modification 2

When the present invention is applied to the motor 14a which drives the air compressor 14, since the oxidant gas is supplied more than necessary as a result of the above-mentioned scavenging processing (i.e., excessive oxidant gas occurs), there is a concern that the electrolyte membrane in the fuel cell 2 might be dried too much, although the present embodiment has not particularly mentioned this concern. In order to prevent such a problem, a part of the oxidant gas supplied from the air compressor 14 to the fuel cell 2 may be configured to be exhausted outside as an unreacted gas using an air bypass valve, etc.

Figure 7:
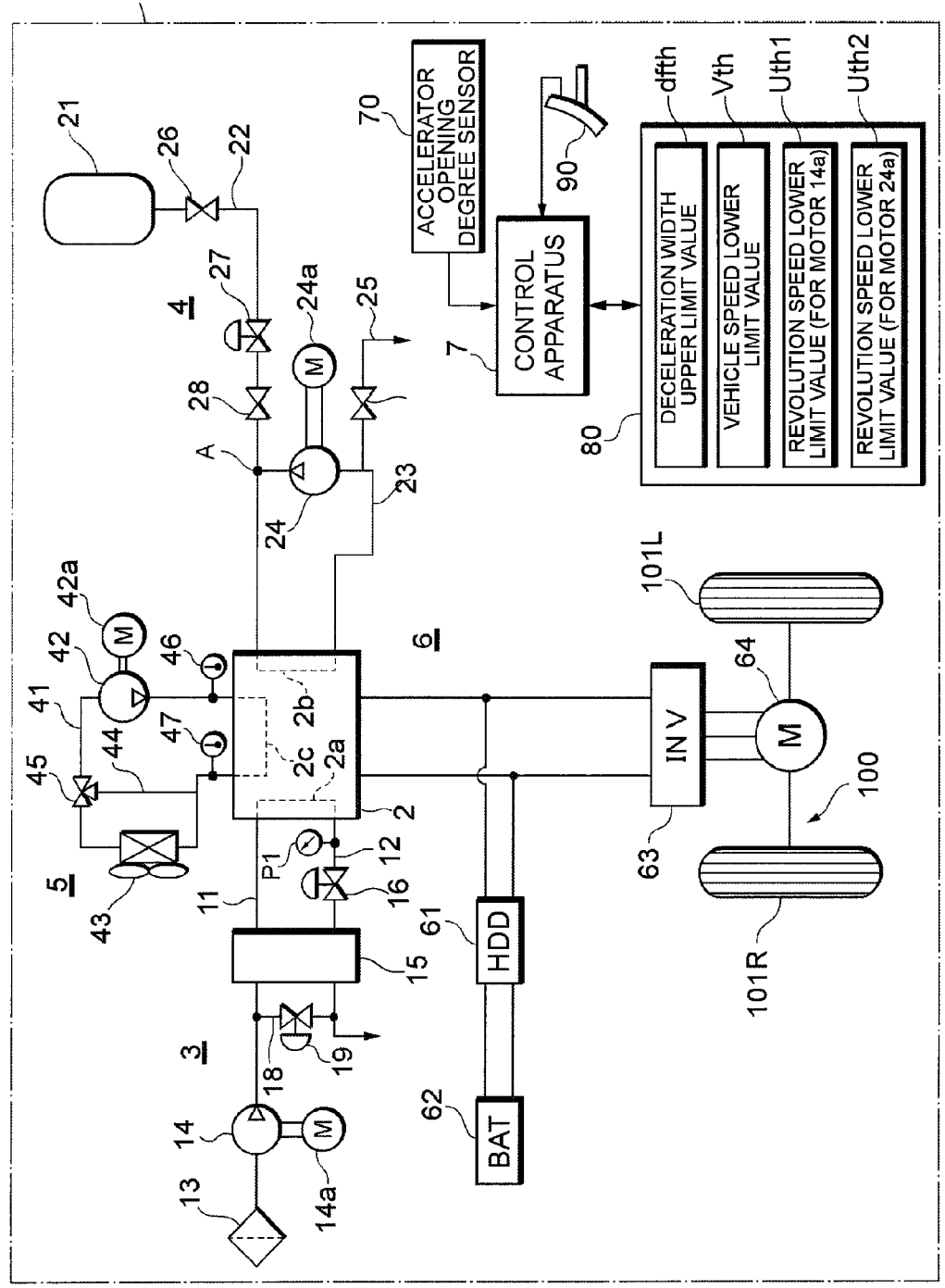
FIG. 7 is a configuration diagram showing a fuel cell system according to modification 2.

Specifically, as shown in FIG. 7, a bypass path 18 which guides a part of an unreacted oxidant gas so as to bypass the fuel cell 2 and flows to a discharge passage (not shown) and an air bypass valve 19 which regulates the flow rate of the oxidant gas flowing in the bypass path 18 (i.e., the amount of bypassing oxidant gas) are provided between the supply path 11 for the oxidant gas and the discharge path 12. The control apparatus (bypass valve regulating unit) 7 controls the opening degree, intervals of open and close times, etc. of the air bypass valve 19 so that the electrolyte membrane is not dried too much during the above-mentioned scavenging processing. Note that the content of control for the air bypass valve 19 may be mapped in advance and stored in the memory 80, etc.

Description of Reference Numerals

1: fuel cell system, 2: fuel cell, 7: control apparatus, 14: air compressor, 14a, 24a and 42a: motor, 24: circulation pump, 42: cooling pump, 40: accelerator opening degree sensor, 90: brake pedal

What is claimed is:

1. A fuel cell system, for a mobile body, which includes: a fuel cell;

and a motor whose revolution speed varies in accordance with a load required from the fuel cell and which can be controlled by a regenerative control, the fuel cell system comprising:

a judgment unit which is programmed to judge whether or not both conditions in which: a fuel cell load is being reduced; and a travel speed is equal to or higher than a set speed, are satisfied; and a revolution speed control unit which is programmed to avoid the regenerative control of the motor and reduces the revolution speed of the motor by a coasting operation when the judgment unit obtains a positive judgment result.

2. The fuel cell system according to claim 1, wherein the judgment unit judges whether or not both conditions in which: the mobile body is being decelerated; and a travel speed is equal to or higher than a set speed, are satisfied.

3. The fuel cell system according to claim 1, wherein:
the motor is a motor which drives a pump for supplying a reactant gas to the fuel cell; and
the set speed is a speed which is set in consideration of: an external noise level which is generated when the mobile body travels at the set speed; and an internal noise level which is generated when the motor is rotated by the coasting operation.

4. The fuel cell system according to claim 3, wherein:
the motor is a motor which drives a circulation pump for returning at least a part of a fuel-off gas discharged from the fuel cell to a supply path for a fuel gas; and
the fuel cell system further comprises:
a first detection unit which detects whether or not the revolution speed of the motor falls below a lower limit threshold value due to the reduction of the revolution speed of the motor by the coasting operation; and
a regulating unit which increases a concentration of hydrogen gas contained in the fuel gas to be supplied to the fuel cell when the revolution speed of the motor falls below the lower limit value.

5. The fuel cell system according to claim 4, wherein:
a purge path branches from the circulation path; and
the regulating unit increases the concentration of the hydrogen gas contained in the fuel gas to be supplied to the fuel cell by regulating an amount of the fuel-off gas to be exhausted outside using a purge valve provided in the purge path.

6. The fuel cell system according to claim 3, wherein:
the motor is a motor which drives a compressor for supplying oxidant gas to the fuel cell; and
the fuel cell system further comprises:
a second detection unit which detects whether or not the revolution speed of the motor falls below a lower limit threshold value due to the reduction of the revolution speed of the motor by the coasting operation; and
a scavenging processing unit which performs, using an oxidant gas to be supplied to the fuel cell, scavenging for a supply path for the oxidant gas when the revolution speed of the motor falls below the lower limit value.

7. The fuel cell system according to claim 6, wherein:
a bypass path is connected between the supply path for the oxidant gas and a discharge path for the oxidant gas, the bypass path guiding at least a part of unreacted oxidant gas to the outside;
the bypass path is provided with a bypass valve which regulates an amount of the unreacted gas to be exhausted outside; and
the fuel cell system further comprises a bypass valve regulating unit which regulates, when the scavenging processing unit performs the scavenging for the supply path, an amount of oxidant gas to be supplied to the fuel cell using the bypass valve.

* * * * *

UNITED STATES PATENT AND TRADEMARK OFFICE
CERTIFICATE OF CORRECTION

| | |
|---|---|
| PATENT NO. | : 8,546,035 B2 |
| APPLICATION NO. | : 12/994892 |
| DATED | : October 1, 2013 |
| INVENTOR(S) | : K. Katano |

It is certified that error appears in the above-identified patent and that said Letters Patent is hereby corrected as shown below:

In the Specification

At column 1, line 31, change "(see a1 in Fig. 3)" to -- (see α1 in Fig. 3) --.

At column 9, line 47, change "(see 32 in FIG." to -- (see β2 in FIG. --.

Signed and Sealed this
Eighteenth Day of February, 2014

Michelle K. Lee
*Deputy Director of the United States Patent and Trademark Office*